(12) United States Patent
Shen

(10) Patent No.: US 6,571,724 B1
(45) Date of Patent: Jun. 3, 2003

(54) STERN DEPRESSOR TYPE MOTION STABILIZATION SYSTEM FOR MARINE VESSEL

(75) Inventor: Young T. Shen, Potomac, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 159 days.

(21) Appl. No.: 09/775,982

(22) Filed: Feb. 1, 2001

(51) Int. Cl.[7] .................................................. B63B 1/22
(52) U.S. Cl. ........................ 114/284; 114/122; 114/286
(58) Field of Search ................... 114/121, 122, 114/126, 284, 285, 286, 287

(56) References Cited

U.S. PATENT DOCUMENTS 4,261,278 A * 4/1981 Gaudin ....................... 114/126
4,909,175 A * 3/1990 Arnseson .................... 114/285

* cited by examiner

Primary Examiner—Sherman Basinger
(74) Attorney, Agent, or Firm—Jacob Shuster

(57) ABSTRACT

Depressors mounted on the stern of a marine vessel are deployed by displacement from positions retracted from the seawater to positions immersed therein so as to divert exit flow of the seawater along retarded flow paths from the stern during vessel travel. Such deployment of the depressors is regulated under motion stabilizing control to produce corrective roll and pitch inducing forces on the vessel in response to diversions of the exit flow by the depressors.

7 Claims, 2 Drawing Sheets

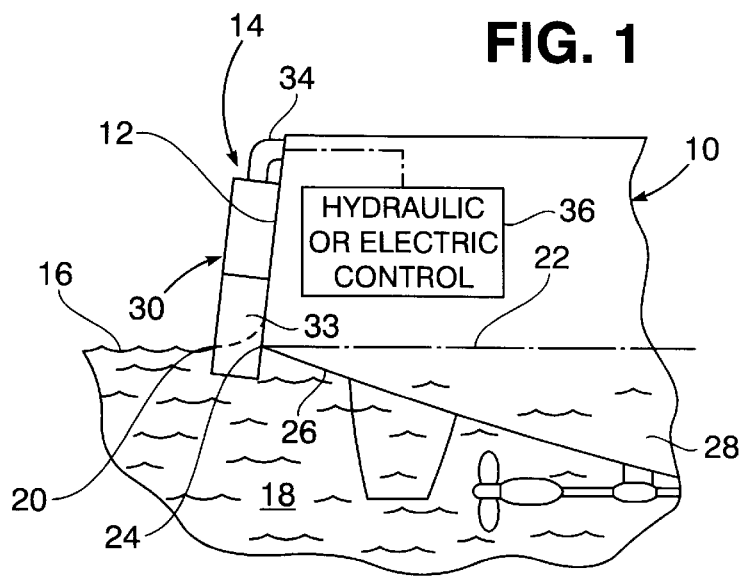
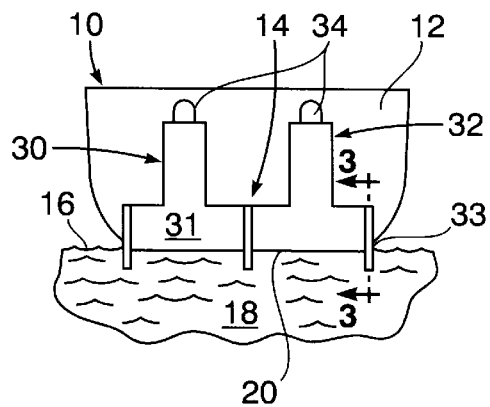
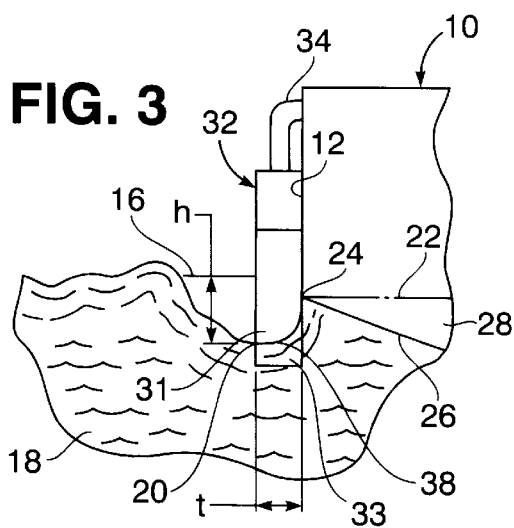
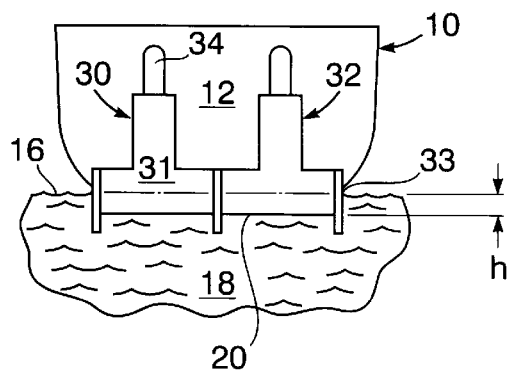

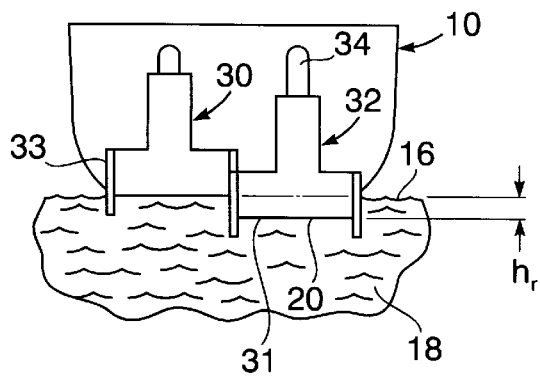
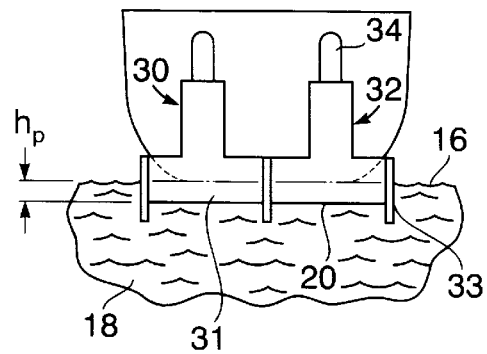
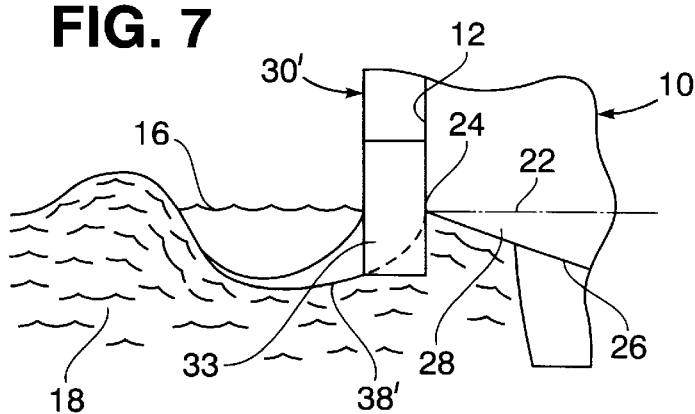
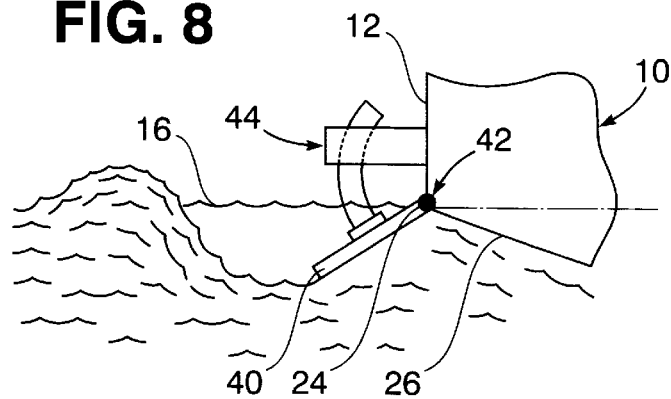

US 6,571,724 B1

STERN DEPRESSOR TYPE MOTION STABILIZATION SYSTEM FOR MARINE VESSEL

The present invention relates generally to stabilizing motions such as roll and pitch imparted to marine vessels during seawater travel.

BACKGROUND OF THE INVENTION

Marine vessels such as naval ships often slow down during travel in rough seas so as to reduce seawater wave induced motions such as roll and pitch, because excessive amounts of such motions may seriously degrade combat readiness, adversely affect performance of on-board systems such as weapons and have other deleterious affects. Various methods have therefore been developed to reduce roll and pitch including use of active devices. Such active devices applied for example to fins, gyros, tanks and rudders often introduce cavitation, vibration and tip vortex problems at high travel speeds. It is therefore an important object of the present invention to provide active devices for inducing corrective roll and pitch motions on marine vessels during seawater travel under rough wave conditions for motion stabilization purposes without introducing the problems heretofore experienced.

SUMMARY OF THE INVENTION

In accordance with the present invention, a motion stabilizer system includes a pair of depressors in sliding contact with each other disposed on the stem of a marine vessel between the port and starboard sides thereof, for displacement between positions retracted from the seawater and deployed positions immersed therein. Lower end portions of such depressors immersed in the seawater in the deployed positions divert and smooth exit flow of the seawater from the stem between side plates along curved flow path surfaces during vessel travel. Such diversion of the exit flow increases dynamic forces heretofore induced by such exit flow. One of such depressors, on either the port or starboard side, is deployed by an appropriate distance into the seawater under motion stabilization control to produce increased hydrodynamic forces in response to correspondingly diverted exit flow of the seawater from the stem for imparting corrective roll on the vessel in one angular direction to cancel roll otherwise imparted by the seawater under rough wave conditions. Both of the depressors are simultaneously deployed on the other hand under stabilization control for immersion into the seawater by some other appropriate distance to produce hydrodynamic forces in response to exit flow which impart corrective pitch on the vessel for cancellation of pitch otherwise resulting from seawater flow under rough conditions.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein:

FIG. 1 is a side elevation view of a portion of a marine vessel during seawater travel having a stern mounted depressor type motion stabilization system in accordance with one embodiment of the present invention;

FIG. 2 is an end view of the vessel shown in FIG. 1, illustrating a pair of depressors associated with the motion stabilizer system in retracted positions;

FIG. 3 is an enlarged partial side elevation view, similar to that of FIG. 1 showing the depressors of the motion stabilizer system in a deployed position immersed in the seawater;

FIG. 4 is an end view corresponding to that of FIG. 3, showing both of the depressors in the deployed position immersed in the seawater;

FIG. 5 is an end view showing one of the depressors in the deployed position immersed in the water an appropriate distance for achieving roll stabilization;

FIG. 6 is an end view showing both of the depressors in deployed positions immersed in the seawater by an appropriate distance for achieving pitch stabilization;

FIG. 7 is a partial side elevation view similar to that of FIG. 3, illustrating another embodiment of the motion stabilizer system featuring a modified form of depressor; and FIG. 8 is a partial side elevation view similar to that of FIG. 3, illustrating yet another embodiment of a motion stabilizer system.

DETAILED DESCRIPTION OF PREFERRED EMBODIMENTS

Referring now to the drawing in detail, FIG. 1 illustrates a transom portion of a marine vessel 10, having an end stern 12 to which is attached a motion stabilizer system generally referred to by reference numeral 14. Such stabilizer system 14 as shown in FIG. 1 is retracted relative to a surface 16 of a body of seawater 18 on which the vessel 10 is floatingly supported during normal operational travel. In such retracted condition of the stabilizer system 14, flow of water from the stem 12 occurs without disturbance from a lowermost exit end 20 of the system 14 at a level 22 of the water surface 16, closely spaced rearwardly from the intersection 24 between the stern 12 and the slope of a surface 26 of the vessel buttock 28.

As shown in FIG. 2, the system 14 includes a pair of depressors 30 and 32 having lower end portions 31 in sliding contact with each other to accommodate relative vertical displacement during deployment from their retracted portions as hereinafter explained. Plates 33 attached to the lower end portions 31 of the depressors project into the seawater. Displacement is imparted to the depressors 30 and 32 through actuators 34 extending into the vessel 10 to a hydraulic or electrical control 36 as diagrammed in FIG. 1.

Referring now to FIG. 3, the starboard sided one of the depressors 32 is shown deployed into a position relative to the water 18 to thereby retard and divert exit flow from the water surface level 22 around the stem 12 between side plates 33 from intersection 24 with the slope of the buttock surface 26 to the lowermost exit flow end 20 of the deployed depressor 32. The depressors 30 and 32 are fitted with such side plates 33 to enhance generation of hydrodynamic force induced by water exit flow. The rearwardly facing surface 38 of the depressor 32 or 30 between the intersection 24 and the exit flow end 20 is curved to insure smoothing of the retarded exit flow along a stern wave path extending from the intersection 24 below the water surface level 22, as depicted in FIG. 3, to increase hydrodynamic pressure distributed over the surface 26 of the buttock 28 and thereby provide a resultant force (F) as a function of several variables including the slope angle of the buttock surface 26, vertical depressor deployment distance (h) between the water surface level 22 and the exit flow line 20; and the thickness (t) of the depressor 32 or 30. One or both of the depressors 30 and 32, as shown in FIGS. 4 and 5, may be downwardly deployed into the water 18 during vessel travel by vertical displacement below the water surface 16 corresponding to the deployment distance (h).

FIG. 5 shows deployment of one of the depressors 32 a distance (hr) into the water 18 for roll-stabilization purposes. Thus, a force (F) as a function of (hr) is hydrodynamically produced in an upward direction on the starboard side of the vessel 10 during travel as a result of the exit flow diversion, as hereinbefore pointed out with respect to FIG. 3. At the same time, a downward hydrodynamic force is produced by exit flow on the port side of the vessel 10 as shown in FIG. 5, where the depressor 30 is retracted. Such upward and downward forces in 180° directional phase relation to each other on the port and starboard sides of the vessel 10 adjacent its stem 12, is induced under controlled deployment of the depressors 30 and 32 by means of the control 36 to impart a desirable roll moment to the vessel 10 used to cancel roll moment induced by incoming waves, and thereby effect roll stabilization.

FIG. 6 shows synchronized deployment of both of the depressors 30 and 32 a distance (hp) by means of the control 36 for pitch stabilization purposes. The increase in dynamic forces thereby created under diverted exit flow at locations on both the starboard and the port sides of the buttock 28 results in a pitch moment as a product of the increase in forces and the distances from the buttock locations thereof to the center of gravity of the vessel 10. Operation of the control 36 to provide such simultaneous in phase deployment of both of the depressors 30 and 32 by the appropriate distance (hp), will accordingly generate and impart a maximized pitch moment to the vessel 10, canceling pitch movement otherwise imposed by the seawater during vessel travel, to effect pitch stabilization.

The cross-sectional profiles of the depressors 30 and 32 through which the desired hydrodynamic performance is achieved under regulation of the control 36 as hereinbefore described may be varied as illustrated for example in FIG. 7. Exit flow as shown in FIG. 7 is diverted by a depressor 30' modified along an extended smoothing flow path formed by a rearwardly facing curved surface 38'.

According to yet another embodiment as illustrated in FIG. 8, the depressors 30 and 32 as hereinbefore described with respect to FIGS. 1–6 are respectively replaced by depressor plates 40 pivotally connected to the vessel 10 at stern intersection 24 by hinges 42. The depressor plates 40 accordingly undergo arcuate displacement from positions aligned with the water line level 16 to deployed positions as shown in FIG. 8 causing diverted exit flow of the seawater similar to that described with respect to FIG. 7. Displacement of the depressors plates 40 is effected by a suitably controlled actuator device 44 attached to and projecting rearwardly from the stern 12. Curved actuator rods 46 attached to the depressor plates 40 therefore extend through the actuator device 44 for imparting displacement to such depressor plates 40.

Obviously, still other modifications and variations of the present invention may be possible in light of the foregoing teachings. It is therefore to be understood that within the scope of the appended claims the invention may be practiced otherwise than as specifically described.

What is claimed is:

1. A system for stabilizing roll and pitch of a marine vessel during travel through seawater, comprising: depressor means operationally mounted on the vessel for deployment by displacement to hydrodynamically generate forces applied to the seawater and to the vessel; and control means connected to said depressor means for said displacement thereof to cancel roll moment and pitch moment otherwise imposed by the seawater during said travel of the vessel; said depressor means including a pair of depressors in sliding contact with each other between port and starboard sides of the vessel during projection thereof.

2. The system as defined in claim 1, wherein each of said depressors includes: surface means projected into the seawater below a surface level thereof in response to the displacement thereof by the deployment means for diverting flow of the seawater from the vessel along an exit flow path during said travel of the vessel.

3. The system as defined in claim 2, wherein said surface means of the depressors have curved flow smoothing profiles forming said exit flow path extending toward lowermost exit ends of the depressors.

4. The system as defined in claim 2, wherein said depressors are hingedly connected to the vessel at the seawater surface level.

5. In a system for stabilizing motion of a marine vessel during travel through seawater, said vessel having a stern and a sloped buttock extending forwardly therefrom in direction of said travel; depressor means mounted on the stem for displacement between positions respectively retracted at a seawater surface level and deployed to change exit flow from the stern induced during said travel of the vessel; and control means connected to the depressor means for stabilizing the motion of the vessel by hydrodynamic generation of forces within the seawater applied to the depressor means and the buttock of the vessel in response to said displacement of the depressor means under regulation of the control means.

6. The system as defined in claim 5, wherein the depressor means includes a flow smoothing surface projected into the seawater along which the exit flow occurs in response to said displacement to the deployed position.

7. In combination with a marine vessel having a stern and a buttock extending therefrom between port and starboard sides within seawater; and depressors adapted to be deployed by displacement on the stern; a method for canceling motions imparted by the seawater to the vessel during travel, including the steps of: deploying the depressors from retracted positions at seawater surface level to divert exit flow of the seawater from the stern during said travel of the vessel for hydrodynamic generation of corrective roll and pitch inducing forces applied to the buttock on the vessel.

* * * * *